United States Patent
Buschmann et al.

(10) Patent No.: US 10,927,512 B2
(45) Date of Patent: Feb. 23, 2021

(54) ROAD FINISHING MACHINE OR CHARGER VEHICLE WITH PUSHING MEANS FOR A MATERIAL TRANSFER PROCESS

(71) Applicant: JOSEPH VOEGELE AG, Ludwigshafen/Rhein (DE)

(72) Inventors: Martin Buschmann, Neustadt (DE); Thomas Schmidt, Plankstadt (DE); Martin Kirschbaum, Limburgerhof (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 0 days.

(21) Appl. No.: 16/887,130

(22) Filed: May 29, 2020

(65) Prior Publication Data
US 2020/0291586 A1 Sep. 17, 2020

Related U.S. Application Data (62) Division of application No. 16/040,899, filed on Jul. 20, 2018, now Pat. No. 10,822,753.

(30) Foreign Application Priority Data

Jul. 21, 2017 (EP) .................................. 17182524

(51) Int. Cl.
| | |
|---|---|
| *E01C 19/48* | (2006.01) |
| *B60D 3/00* | (2006.01) |
| *B65G 41/00* | (2006.01) |

(52) U.S. Cl.
CPC ............... *E01C 19/48* (2013.01); *B60D 3/00* (2013.01); *B65G 41/008* (2013.01);
(Continued)

(58) Field of Classification Search
CPC .. E01C 19/48; E01C 2301/04; E01C 2301/08; B60D 3/00; B65G 41/008; B65G 2201/04; B65G 2813/00
(Continued)

(56) References Cited

U.S. PATENT DOCUMENTS

| | | |
|---|---|---|
| 3,250,191 A | 5/1966 | Potts |
| 4,955,754 A | 9/1990 | Smith |
| (Continued) | | |

FOREIGN PATENT DOCUMENTS

| | | |
|---|---|---|
| CN | 102797213 A | 11/2012 |
| DE | 92 03 902.2 U1 | 7/1992 |
| (Continued) | | |

OTHER PUBLICATIONS

European Search Report dated May 22, 2018, Application No. 17182524.3-1002, Applicant Joseph Voegele AG, 4 Pages.
(Continued)

*Primary Examiner* — Raymond W Addie
(74) *Attorney, Agent, or Firm* — Brooks Kushman P.C.

(57) ABSTRACT

A road-finishing machine for producing a paving layer from a laying material or a charger vehicle for supplying the road-finishing machine with a laying material. The road-making machine comprises a material bunker, and a pushing means fixed forward of the material bunker at a chassis, such that pushing rollers of the pushing means may dock to rear tires of a truck. The pushing rollers comprise a pair of first pushing rollers mountable in a first position in a seat of a traverse of the pushing means. Either the pushing means is expandable by at least one changeable attachment to which the first pushing rollers may be mounted in a second position further forward with respect to the first position, or the
(Continued)

pushing means comprises a pair of second pushing rollers which may be selectively positioned forward of the first pushing rollers.

11 Claims, 11 Drawing Sheets

(52) U.S. Cl.
CPC ...... *B65G 2201/04* (2013.01); *B65G 2813/00* (2013.01); *E01C 2301/04* (2013.01); *E01C 2301/08* (2013.01)

(58) Field of Classification Search
USPC ........................................................ 404/118
See application file for complete search history.

(56) References Cited

U.S. PATENT DOCUMENTS

| | | |
|---|---|---|
| 5,004,394 A | 4/1991 | Goodwin et al. |
| 5,009,546 A | 4/1991 | Domenighetti |
| 5,197,848 A | 3/1993 | Musli |
| 5,955,754 A | 9/1999 | Azuma et al. |
| 6,007,272 A | 12/1999 | Macku |
| 8,827,592 B2 | 9/2014 | Frelich et al. |
| 9,145,649 B2 | 9/2015 | Buschmann et al. |
| 9,481,965 B2 | 11/2016 | Schuette |
| 2013/0322965 A1 | 12/2013 | Frelich |
| 2015/0016886 A1 | 1/2015 | Frelich |
| 2016/0230355 A1 | 8/2016 | Nelson |

FOREIGN PATENT DOCUMENTS

| | | |
|---|---|---|
| DE | 198 00 915 A1 | 7/1999 |
| DE | 20 2004 007 576 U1 | 9/2004 |
| DE | 20 2012 009 144 U1 | 10/2012 |
| DE | 10 2011 120 161 A1 | 6/2013 |
| DE | 10 2013 216 374 A1 | 2/2015 |
| EP | 0 667 415 A1 | 8/1995 |
| EP | 2 295 641 A2 | 3/2011 |
| EP | 2 527 534 A1 | 11/2012 |
| JP | S5245227 U | 3/1977 |
| JP | 2004124466 A | 4/2004 |
| JP | 2006161399 A | 6/2006 |
| JP | 2006-241838 A | 9/2006 |

OTHER PUBLICATIONS

Japanese Office Action dated May 21, 2019, Application No. 2018-131592, 4 Pages.

Chinese Office Action & Search Report dated May 7, 2020 (with English Machine Translation), Application No. 201810800126.5, 12 Pages.

U.S. Notice of Allowance dated Jul. 13, 2020, U.S. Appl. No. 16/040,899, 28 pages.

ROAD FINISHING MACHINE OR CHARGER VEHICLE WITH PUSHING MEANS FOR A MATERIAL TRANSFER PROCESS

CROSS-REFERENCE TO RELATED APPLICATIONS

This application is a divisional application of U.S. application Ser. No. 16/040,899, filed Jul. 20, 2018, which claims foreign priority benefits under 35 U.S.C. § 119(a)-(d) to European patent application number EP 17182524.3, filed Jul. 21, 2017, each of which is incorporated herein by reference in its entirety.

TECHNICAL FIELD

The present disclosure relates to a road finishing machine or a charger vehicle for a road finishing machine.

BACKGROUND

A road finishing machine for producing a paving layer from a laying material and a charger vehicle for supplying the road finishing machine with laying material to be laid each comprise a material bunker to store laying material therein for their operation. The respective material bunkers of the aforementioned automotive road making machines are supplied with the laying material on site from trucks. The supplied laying material is poured from the trucks into the respective material bunkers. For the material transfer process, the road finishing machine and the charger vehicle have, each in the front, forward of the respective material bunker, a pushing means to which a truck docks rearwards with its rear tires. The docking to the pushing means causes the truck to be pushed in the front in an idle state at a predetermined distance from the road finishing machine or the charger vehicle during the material transfer process.

EP 2 527 534 A1 and EP 0 667 415 A1 each disclose a road finishing machine comprising, for the material transfer process, pushing means to the pushing rollers of which rear tires of a truck may dock.

U.S. Pat. No. 5,955,754 A discloses a road finishing machine with a pushing means fixed thereto and supporting a pair of pivoted pushing rollers. As a damping element, a hydraulic cylinder is employed for the pushing rollers.

U.S. Pat. No. 5,004,394 A discloses leaf spring-mounted, pivoted and hydraulically adjustable pushing rollers of a pushing means.

EP 2 295 641 A2 discloses a road finishing machine and a charger vehicle having pushing means whose pushing rollers are mounted to be adjustable by means of hydraulic cylinders.

DE 10 2011 120 161 A1, DE 20 2004 007 576 U1, and U.S. Pat. No. 8,827,592 B2 each disclose a pushing means for a road finishing machine whose traverse can be fixed to different positions at the chassis of the road finishing machine.

It is a problem that for the material transfer process, trucks having differently long rear dump body projections are employed worldwide, so that docking to conventional pushing means is not always possible.

For trucks employed in the European market, pushing means that may be mounted to the chassis at different positions offset in the direction of travel as a complete unit have been therefore sufficient due to the small dump body projections of the trucks. Due to their high weight, however, complete pushing means may be only relocated within limits.

For trucks having longer dump body projections, as they are employed in certain countries, however, the well-known pushing means are not sufficient to dock the pushing rollers fixed thereto to the rear tires of such trucks. Accordingly, trucks having a dump body with an overlength cannot be pushed along in the front by the road finishing machine or the charger vehicle at a predetermined distance during the material transfer process. For dumping the laying material, it is therefore difficult to maintain the predetermined distance between the truck and the following road finishing machine or charger vehicle as the truck driver himself has to regulate the distance to the road finishing machine or charger vehicle. The risk of a collision between the truck and the following road finishing machine or charger vehicle is thereby increased.

SUMMARY

In view of the disadvantages resulting from prior art, it is the object of the disclosure to equip a road finishing machine or a charger vehicle with a pushing means that is suited to selectively dock both to a rear tire of a truck having a short dump body projection and to a rear tire of a truck having a long dump body projection to push the respective trucks in front at a predetermined distance during a material transfer process.

The disclosure relates to a road finishing machine for producing a paving layer from a laying material. The disclosure equally relates to a charger vehicle for supplying the road finishing machine with a laying material to be laid.

The road finishing machine or the charger vehicle each comprise a material bunker for receiving the laying material arranged in the front, as viewed in the direction of travel, on a chassis of the road finishing machine or the charger vehicle, and a pushing means for a material transfer process. The pushing means is fixed forward of the material bunker, as viewed in the direction of travel, to the chassis such that pushing rollers mounted thereto may dock to rear wheels of a truck when the truck is dumping the laying material into the material bunker of the road finishing machine or the charger vehicle.

The pushing rollers include a pair of first pushing rollers to be mounted in at least one first position with respect to a traverse of the pushing means, as viewed along the direction of travel, in which position the first pushing rollers are fixed in a seat of the traverse.

According to the disclosure, either the pushing means is expandable by means of at least one changeable attachment at which the first pushing rollers may be mounted in the second position moved further to the front, as viewed in the direction of travel, with respect to the first position, or else the pushing means comprises a further pair of second pushing rollers which may be optionally placed in front of the first pushing rollers, as viewed in the horizontal plane of projection.

At the pushing means, the changeable attachment may be optionally employed as an add-on piece at the traverse which may be arranged as a coupling member between the traverse and the first pushing rollers to support the pair of first pushing rollers moved further to the front with respect to their first position, so that for a material transfer process, they may dock to the rear tires of a truck having a long dump body projection while laying material is being poured from the truck's dump body into the material bunker of the road finishing machine or the charger vehicle.

Thereby, even trucks having a long dump body projection may be pushed along at a predetermined distance in front of the road finishing machine or the charger vehicle without any collision occurring between the truck and the road finishing machine or the charger vehicle. The laying material may then be perfectly dumped from the truck into the material bunker of the road finishing machine or the charger vehicle.

In the disclosure, the pushing means suitably forms a module that can be expanded by the changeable attachment. Due to the modular structure, individual components of the pushing means may be combined into a whole in different ways in the disclosure. In particular, the pair of first pushing rollers is embodied for being employed at the pushing means with and without the assembly of the changeable attachment. The changeable attachment is not provided as an integral part of the pushing means but can be attached to the pushing means depending on the employment, i.e., optionally as an expanded part.

A further advantage of embodiments of the disclosure is that not the complete pushing means has to be adjusted in order to relocate the pair of first pushing rollers to the front, as viewed in the direction of travel. Moving forward the first pushing rollers by means of the changeable attachment supporting them may therefore be performed with less efforts than in a case where the complete pushing means has to be displaced.

Preferably, the changeable attachment may be hung into the seat of the traverse instead of the first pushing rollers. The seat of the traverse may be thereby optionally used either as a bearing for fixing the first pushing rollers in their first position, or as a bearing for fixing the changeable attachment. This dual function altogether favors the modular structure of the pushing means and in particular ensures a compact and standardized assembly of the pushing means. The pushing means thus occupies, despite its advantageous adjusting facilities, a relatively small space forward of the material bunker.

Preferably, the changeable attachment comprises, for the pair of first pushing rollers, a seat which is essentially embodied equally to the seat of the traverse for the first pushing rollers. A change of position of the pushing rollers between the respective seats that can be carried out swiftly and easily is then particularly easily possible. It would also be possible that in the seat of the changeable attachment, a further changeable attachment for supporting the first pushing rollers at a position even further to the front is optionally attachable.

According to an advantageous variation, the changeable attachment is pivoted at the traverse, in particular in the seat of the traverse. It is particularly advantageous for the changeable attachment to be pivoted at the traverse between a first orientation, in which it is essentially oriented horizontally to mount the first pushing rollers in the second position, and a second orientation in which it is tipped up towards the material bunker and positions the pushing rollers supported at it above the traverse to adjust the pushing means for a transport of the road finishing machine or the charger vehicle.

Preferably, the changeable attachment is formed as a rigid body. As such, it in particular does not form a deformable elastic damper for the pushing rollers and as such neither causes any hydraulic or mechanic resilience. The shape of the changeable attachment does in particular not change if rear tires of a truck dock to the pushing rollers supported by it and the truck is, during the material transfer process, pushed along in front of the road finishing machine or the charger vehicle. The changeable attachment may thus maintain the respective first pushing rollers at a fixed distance to the traverse of the pushing means. A collision of the truck, in particular its dump body, with the road finishing machine or the charger vehicle may thus be prevented.

Preferably, the changeable attachment is assembled using a plurality of metallic plates. These may be, for example, welded to each other to form a rigid body for the changeable attachment. The changeable attachment is particularly stable if it at least partially has a box-like shape.

Preferably, the changeable attachment supports the first pushing rollers in the second position that is, as viewed in a horizontal plane of projection and in the direction of travel, positioned further to the front by a predetermined distance, in particular in a range between 250 mm to 350 mm, than in a case where the first pushing rollers are mounted in the first position in the seat of the traverse. A distance of about 300 mm showed to be particularly advantageous for the use with larger trucks in this respect. If the first pushing rollers are supported by means of the changeable attachment of the pushing means, these may dock to rear tires of a truck having a long dump body projection to push the truck along at a predetermined distance in front of the road finishing machine or the charger vehicle during an operation of dumping laying material.

Preferably, the changeable attachment comprises a first and a second attachment that may be fixed separately to the traverse one next to the other. For the two attachments, the seat of the traverse preferably provides a corresponding first and second bearing. The two bearings are preferably designed such that the pair of first pushing rollers and the respective attachments may be exchangeably supported at them.

The respective attachments preferably have an identical design, so that they are mutually exchangeable for being fixed to the traverse, in particular for being fixed in the respective bearings. By the changeable attachment consisting of separately formed attachments, the assembly of the attachments, whose weight is split, to the traverse is easier to perform. In addition, even the tipping up of the two separately formed attachments for a transport of the road finishing machine or the charger vehicle can be more easily performed, in a motor-driven or manual way, than in a case where the changeable attachment is integrally formed as an add-on piece.

According to one embodiment, the changeable attachment can be locked at the traverse, in particular in the first and/or second orientation. By that, it may be ensured that during the material transfer process and/or a transport drive, the first pushing rollers will remain in the predetermined position with respect to the chassis of the road finishing machine or the charger vehicle.

According to one variation, the changeable attachment comprises at least one stop abutting against the traverse of the pushing means when the changeable attachment is oriented in such a way that it supports the first pushing rollers in the second position. Here, the stop may be securely held at the traverse to mount the changeable attachment horizontally in view of a pivoted mounting of the changeable attachment. An additional locking in this position is not compulsory. However, it would also be possible to have a thrust bearing formed at the traverse where the stop collar of the changeable attachment can be additionally locked.

As an alternative to the above described changeable attachment, the effect according to the disclosure of pushing rollers of a pushing means that are optionally relocated further to the front could also be achieved by the pushing means comprising a further, second pair of pushing rollers which may be mounted with respect to the first pushing rollers such that they may be positioned at the pushing means forward of the first pushing rollers. The second pushing rollers will then reach to the rear tires of a truck used for the material transfer process having a dump body projection protruding far to the rear.

Preferably, the pair of first pushing rollers may remain mounted to the pushing means independent of the adjusted position of the pair of second pushing rollers. Still preferably, the pair of second pushing rollers is integrally formed at the pushing means. The pair of second pushing rollers may thus be employed quickly as desired, in particular without tools. This means that the second pushing rollers are mounted at the pushing means to be adjustable without tools between the positions predetermined for them.

Preferably, the pushing means comprises at least one swivel mechanism which is designed to bring the pair of second pushing rollers to a second position forward of the pair of first pushing rollers, as viewed in the direction of travel. Trucks having dump body projections protruding to a large extent may then be pushed along in front of the road finishing machine or the charger vehicle for the material transfer process at a sufficiently great distance when the pushing means is docking to the rear tires of the truck with its second pushing rollers.

In particular, the swivel mechanism is designed such that it may hold the pair of second pushing rollers stationary with respect to the traverse of the pushing means if the pair of second pushing rollers is docking to the rear tires of the truck for a material transfer process. Thereby, the truck may be pushed along in front during the material transfer process with respect to a road finishing machine or charger vehicle pushing it at its rear tires at a predetermined constant distance.

Preferably, the pair of second pushing rollers is mounted, when it is tipped down by means of the swivel mechanism, in a rest position whereby the other pair of first pushing rollers may be employed for a material transfer process, in a transport position in which the pair of second pushing rollers is tipped up in the direction of the material bunker, and/or, for a material transfer process, in a second position forward of the first pushing rollers. A changeover between the respective positions may be quickly performed by means of the swivel mechanism.

A preferred development provides for the swivel mechanism to be lockable at the traverse if the pair of second pushing rollers is adjusted in the second position for the material transfer process. Thereby, the pair of second pushing rollers may be particularly stationarily held with respect to the traverse, while the pushing rollers abut against the rear tires of the truck.

One advantageous development provides for the position of the second pushing rollers to be adjustable with respect to the position of the first pushing rollers hydraulically, mechanically or electromechanically. In particular, at least one hydraulic cylinder is provided which is designed to actuate the swivel mechanism for positioning the second pushing rollers.

Preferably, the pair of second pushing rollers is pivoted about a bearing axis of the pair of first pushing rollers. Despite the use of a first and a second pair of pushing rollers, a compact and stable assembly of the pushing means is possible thereby.

It is of assistance if the second pushing rollers can be adjusted from a control platform of the road finishing machine or the charger vehicle. Preferably, at least one hydraulic, electric and/or mechanical actuator is provided to this end.

It is advantageous for the traverse to be fixed to a crossbeam of the chassis such that it is mounted tiltable about a predetermined tilting angle with respect to the crossbeam, as viewed in a horizontal plane, together with the pushing rollers fixed thereto. Thereby, the pushing means is able to compensate a certain oblique orientation of a truck docking to it backwards.

According to a preferred variation, the traverse may be fixed at the front of the chassis, in particular continuously variably, in different positions along the direction of travel. The pushing means may thus be fixed at different positions at the chassis of the road finishing machine or the charger vehicle altogether as a module.

Preferably, the pushing means is mounted, as a module, to be mechanically, pneumatically and/or hydraulically dampened at the chassis of the road finishing machine or the charger vehicle. The damping effect is in particular achieved by at least one damping unit being functionally arranged between the traverse of the pushing means and the crossbeam of the chassis.

Embodiments according to the disclosure will be described more in detail below with reference to the attached drawings.

DETAILED DESCRIPTION

Figure 1:
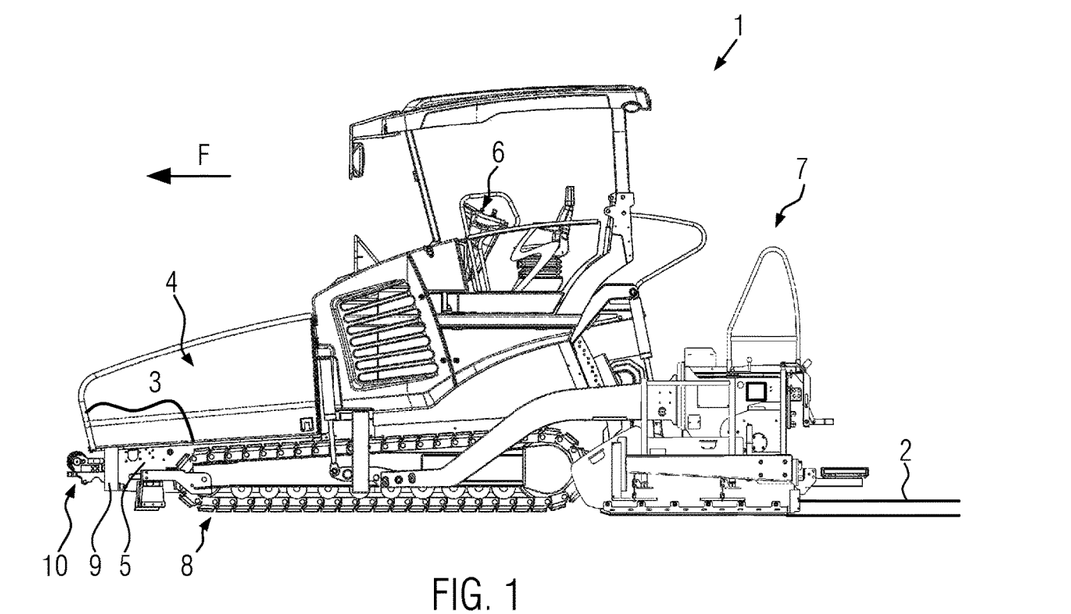
FIG. 1 shows a road finishing machine for producing a paving layer from a laying material.

FIG. 1 shows a road making machine in the form of a road finishing machine 1 for producing a paving layer 2. The road finishing machine 1 comprises a material bunker 4 in which laying material 3 for producing the paving layer 2 is stored. The material bunker 4 is arranged on a chassis 5 of the road finishing machine 1 at the front, as viewed in the direction of travel F. The road finishing machine 1 furthermore comprises a control platform 6 from where an operator may control the road finishing machine 1. As viewed in the direction of travel F at the rear of the road finishing machine 1, a movable screed 7 is arranged by which the road finishing machine 1 processes the laying material 3 into the new paving layer 2. To this end, the laying material 3 stored at the front in the material bunker 4 is transported to the rear against the direction of travel F by means of a non-depicted longitudinal conveying device, is spread in front of the screed 7 and finally compacted by the screed 7 to form the new paving layer 2.

According to FIG. 1, the road finishing machine 1 comprises a running gear 8 embodied as a tracklaying gear. Instead of the tracklaying gear, the running gear 8 could be equipped with a wheel drive. The running gear 8 is fixed to the chassis 5 of the road finishing machine 1. A crossbeam 9 is fixed at the front of the chassis 5, as viewed in the direction of travel F. Forward of the crossbeam 9, a pushing means 10 is mounted. With the pushing means 10, the road finishing machine 1 docks, during a material transfer process, to the rear wheels of a material supply vehicle to push it in front of the road finishing machine 1 at a predetermined distance while the material supply vehicle is dumping the laying material 3 into the material bunker 4.

Figure 2:
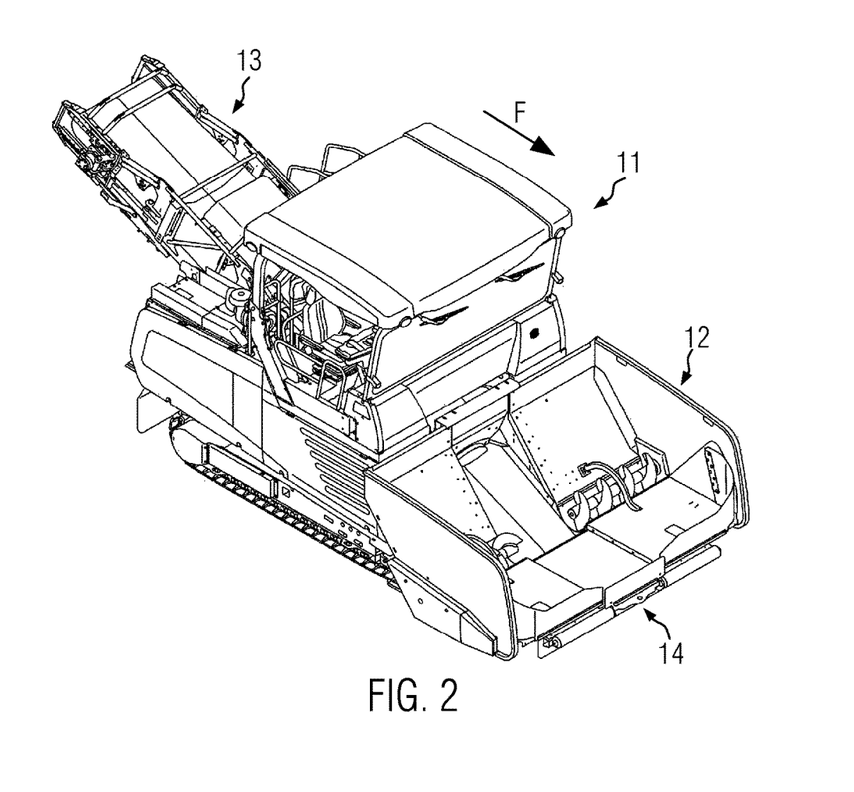
FIG. 2 shows a charger vehicle for supplying the road finishing machine shown in FIG. 1 with a laying material to be laid.

FIG. 2 shows a charger vehicle 11 for supplying a road finishing machine 1 shown according to FIG. 1. The charger vehicle 11 has a material bunker 12 for storing the laying material 3. The charger vehicle 11 furthermore has a material conveying device 13 which is embodied to receive the laying material 3 from the material bunker 12 and to transfer it to a road finishing machine 1 according to FIG. 1 for laying. To this end, the charger vehicle 11 is driving in front of the road finishing machine 1 while the laying material 3 is conveyed from the material conveying device 13 into the material bunker 4 of the road finishing machine 1.

FIG. 2 furthermore shows that a pushing means 14 is mounted at the charger vehicle 11 for-ward of the material bunker 12. The pushing means 14 is fixed to a non-depicted crossbeam. Just as the pushing means 10 of the road finishing machine 1 of FIG. 1, the pushing means 14 of the charger vehicle 11 is also embodied for docking to rear tires of a material supply vehicle to push the material supply vehicle in an idle state during a material transfer process at a predetermined distance in front of the charger vehicle 11.

Figure 3:
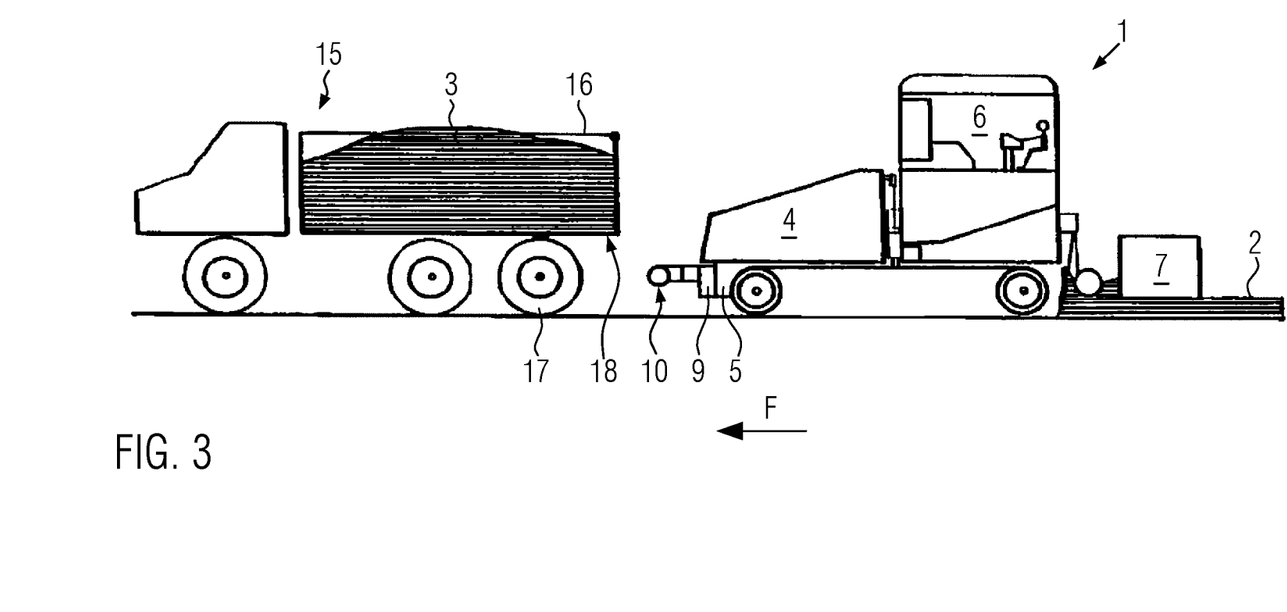
FIG. 3 shows a schematic representation of a road finishing machine and a truck for a material transfer process.

FIG. 3 schematically shows the road finishing machine 1 of FIG. 1 and a truck 15 positioned in front of it. The truck 15 has a dump body 16 loaded with the laying material 3. During the material transfer process, the laying material 3 is dumped out of the dump body 16 of the truck 15 into the material bunker 4 of the road finishing machine 1. The truck 15 could also perform a comparable material transfer with a charger 11 according to FIG. 2. If the pushing means 10 can dock to the rear tires 17 of the truck 15 depends on how long a projection 18 of the dump body 16 shown in FIG. 3 is.

In case the projection 18 projects too far to the rear beyond the rear tires 17 of the truck 15, the truck 15 cannot dock to the pushing means 10 with its rear tires 17 because this would possibly lead to a collision of the dump body 16 with the material bunker 4, 12 of the road finishing machine 1 or the charger 11. In such cases, the truck driver has to steer the truck 15 himself during the material transfer process at a constant distance with respect to the following road finishing machine 1 (or charger vehicle 11) in a controlled manner so that there won't occur any collision of the dump body 16 with the material bunker 4. However, this showed to be difficult in practice.

In the following FIGS. 4 to 12, the disclosure is illustrated with reference to the pushing means 10, 14, 10', 14' represented separate from the road finishing machine 1 or the charger vehicle 11.

Figure 4:
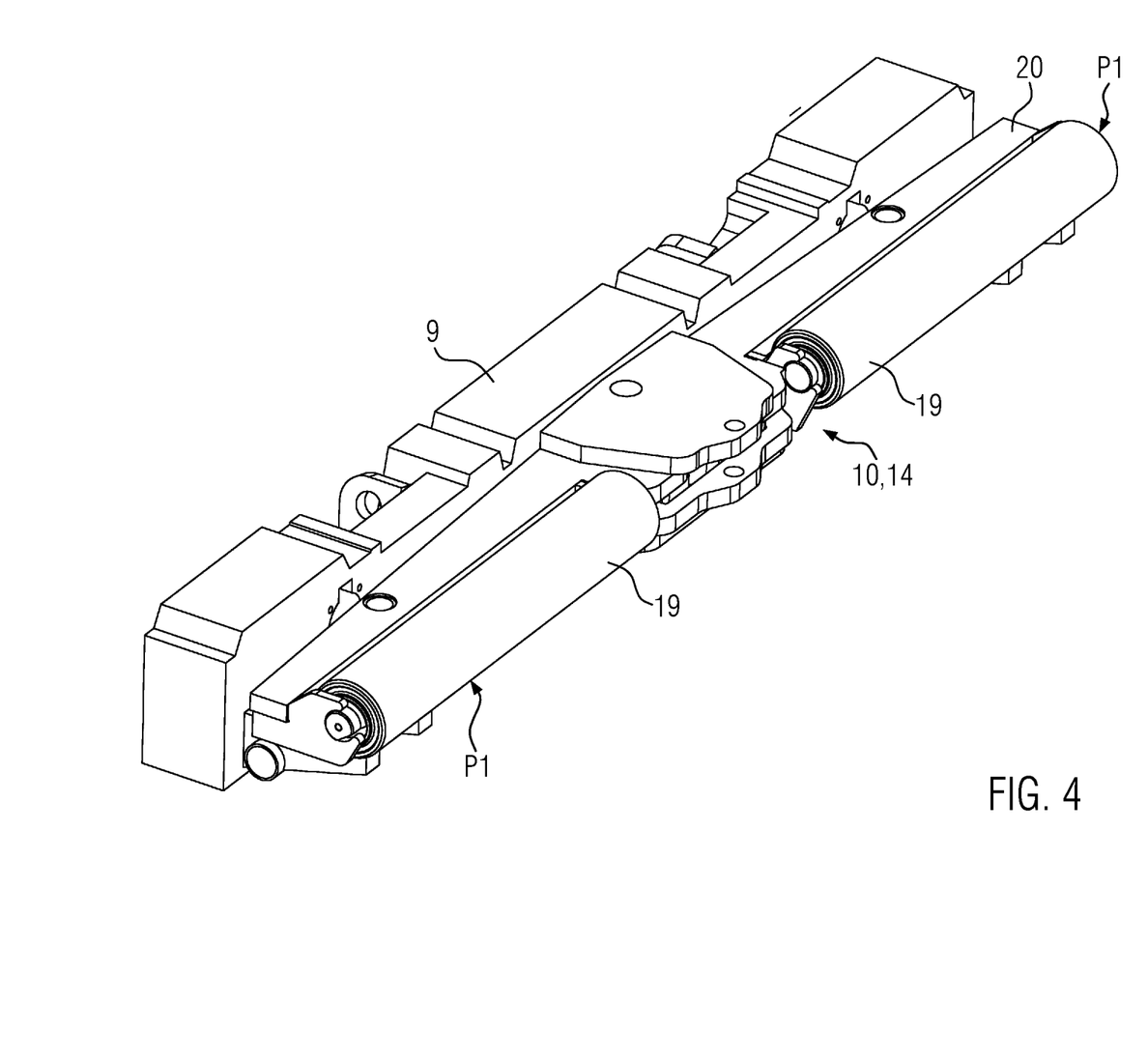
FIG. 4 shows a pushing means without changeable attachment, shown separately.

FIG. 4 shows the pushing means 10, 14 with a pair of first pushing rollers 19 rotatably mounted at a traverse 20. The traverse 20 is fixed to the crossbeam 9. The pair of first pushing rollers 19 is mounted in a first position P1 according to FIG. 4. The pushing rollers 19 mounted in the first position P1 may dock to rear tires of a truck whose dump body projection is short.

Figure 5:
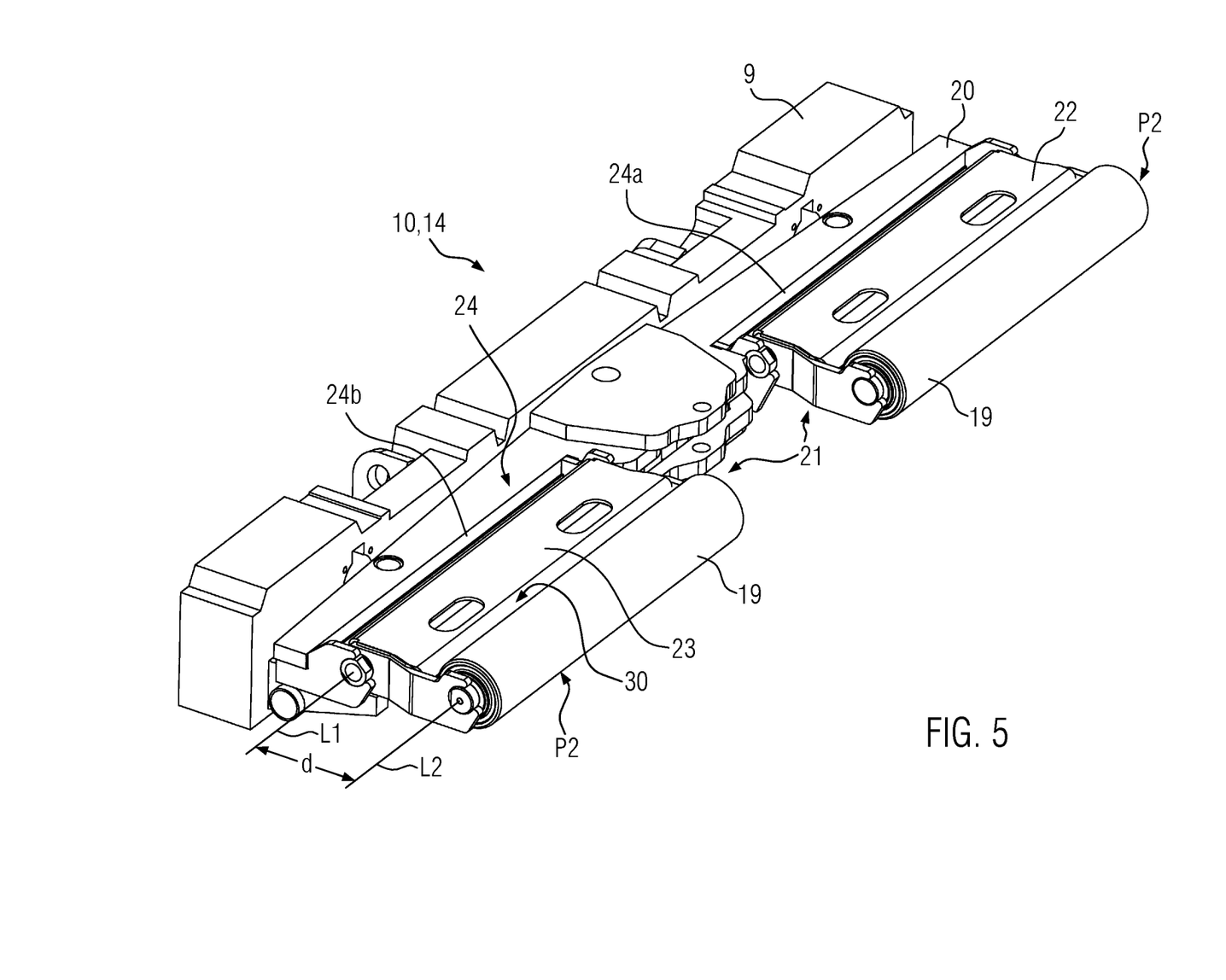
FIG. 5 shows a pushing means with a changeable attachment, shown separately.

According to FIG. 5, the pushing means 10, 14 is expanded by a changeable attachment 21 that supports the pushing rollers 19 in a second position P2 relocated further to the front with respect to their first position P1 shown in FIG. 4. According to FIG. 5, a first bearing axis L1, along which the first pushing rollers 19 are mounted in the first position P1, and a second bearing axis L2, along which the first pushing rollers 19 are mounted in the second position P2, are arranged offset in parallel with respect to each other by a distance d. The distance d is, for example, 300 mm.

As an extension part, the changeable attachment 21 may carry the pair of first pushing rollers 19 in the second position P2 moved to the front to such an extent that the pushing rollers 19 may dock at rear tires of a truck having a long dump body projection for a material transfer process.

FIG. 5 furthermore shows that the changeable attachment 21 is mounted in a seat 24 of the traverse 20. For carrying the pushing rollers 19, the changeable attachment 21 forms a roller seat 30 which is configured corresponding to the seat 24 of the traverse 20. The changeable attachment 21 is embodied in FIG. 5 in two parts of a first attachment 22 and a second attachment 23. The two attachments 22, 23 may be hung, instead of the first pushing rollers 19, into a respective first and second seat 24a, 24b at the traverse 20.

Figure 6:
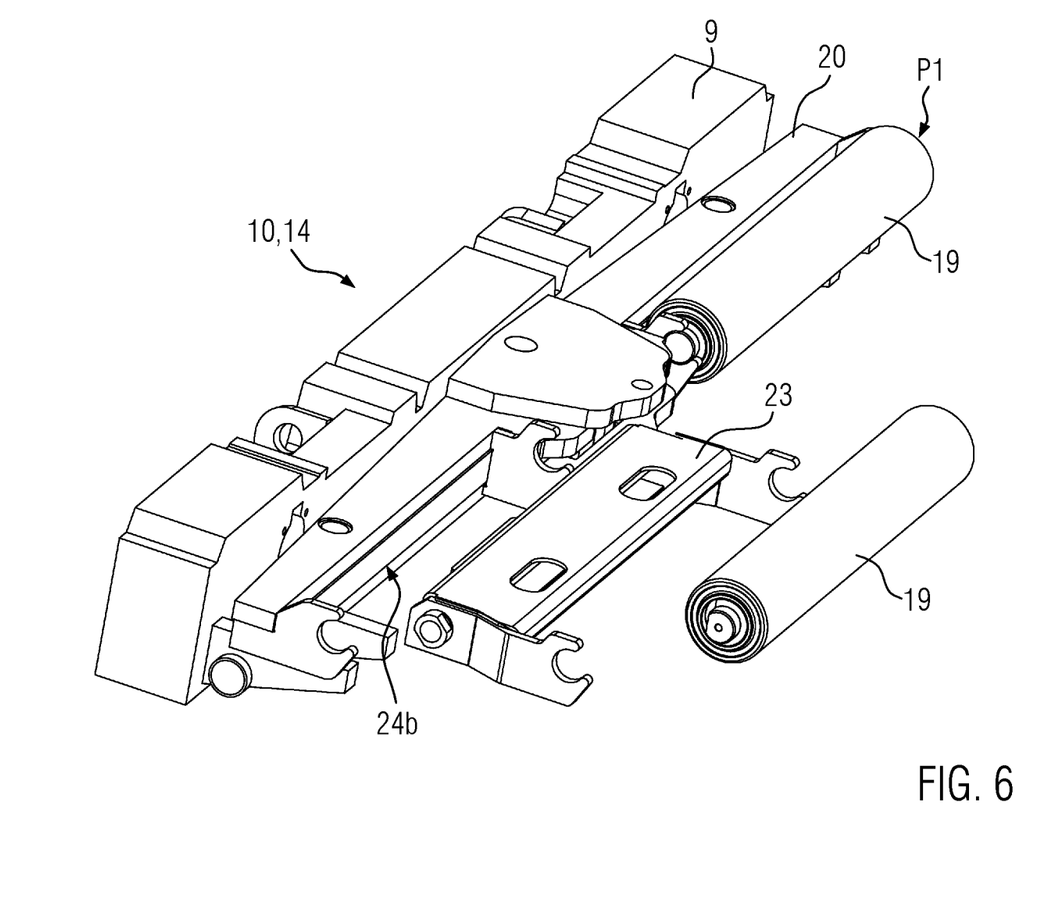
FIG. 6 shows the pushing means in a partially exploded view.

FIG. 6 illustrates that the pushing means 10, 14 may be assembled as a module optionally with or without changeable attachment 21, in particular the pertaining attachments 22, 23.

Figure 7:
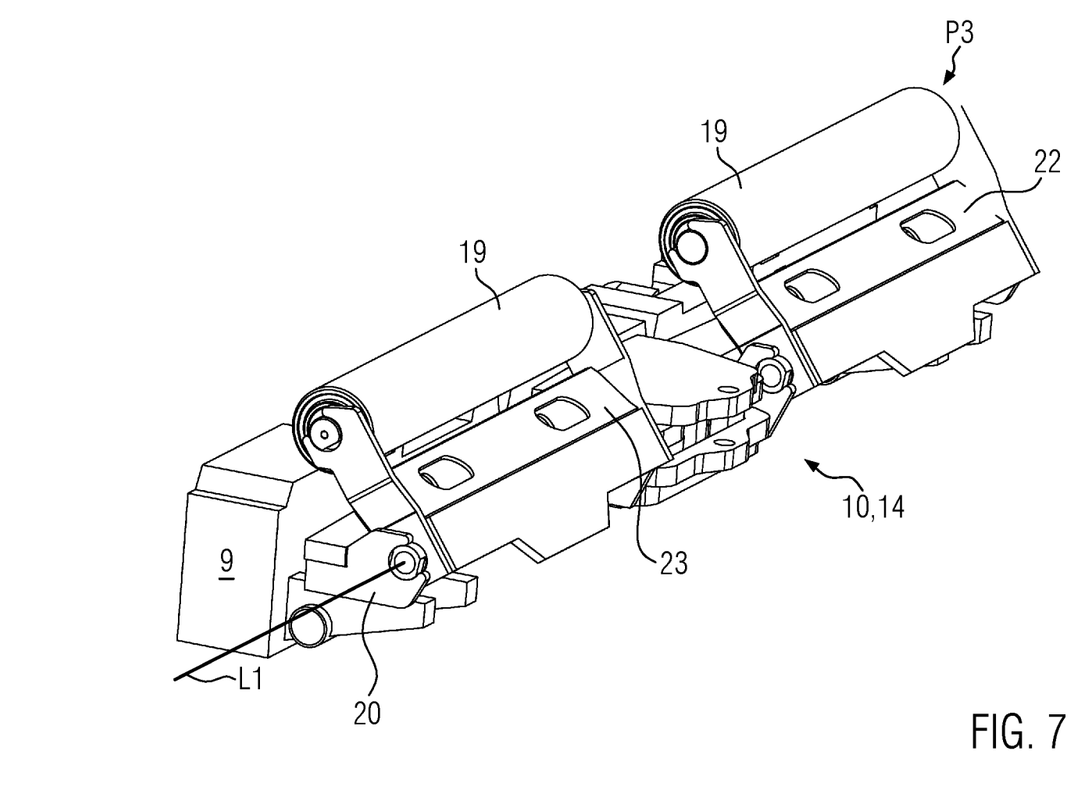
FIG. 7 shows the pushing means according to FIG. 5 with tipped up pushing rollers.

FIG. 7 shows the pushing means 10, 14 with tipped up pushing rollers 19. The pushing rollers 19 are here mounted in a third position. To this end, the respective attachments 22, 23 are mounted swiveled upwards about the bearing axis L1, with an inclined orientation towards the material bunker 4, and are supported in the third position P3 at the traverse 20 for holding the pushing rollers 19. The pushing means 10, 14 may be transferred to this setting for a transport of the road finishing machine 1 or the charger vehicle 11.

Figure 8:
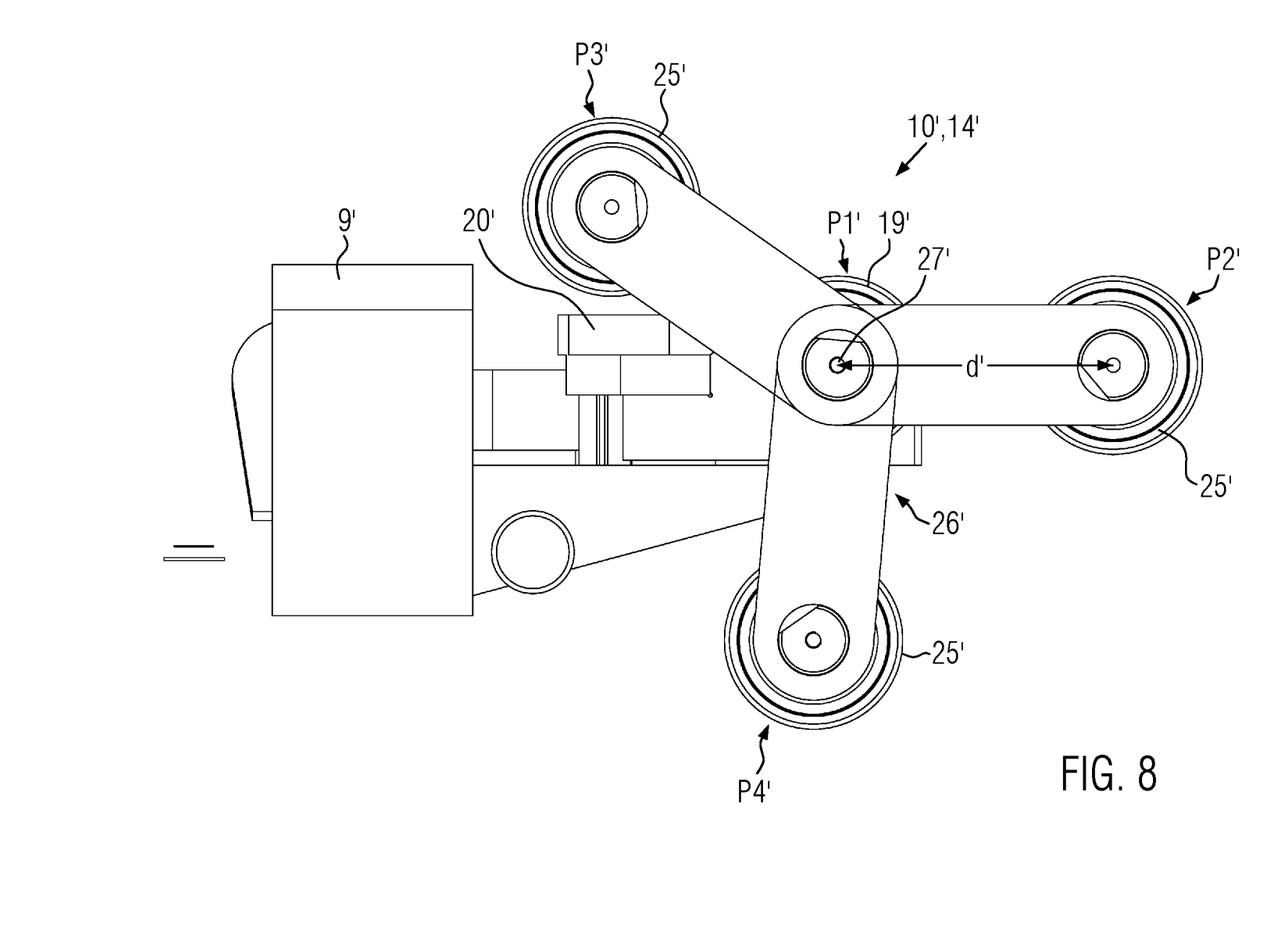
FIG. 8 shows a schematic diagram of a further pushing means with a pair of first and second pushing rollers.

FIG. 8 shows an alternative pushing means 10', 14' of the road finishing machine 1 or the charger vehicle 11.

FIG. 8 shows, in a side view, the pushing means 10', 14' that comprises a pair of first pushing rollers 19' in a first position P1' and a further pair of second pushing rollers 25' arranged in a second position P2' forward of the first pushing rollers 19' by a distance d'. According to FIG. 8, the second pushing rollers 25' may be positioned in different positions by means of a swivel mechanism 26'. Besides the second position P2' shown in FIG. 8, the pushing rollers 25' may be mounted tipped up in a transport position P3' for a transport of the road finishing machine 1 or the charger vehicle 11, respectively, or, if the pair of first pushing rollers 19' is to be employed for the material transfer process, tipped down in a rest position P4'.

According to FIG. 8, the pair of second pushing rollers 25' is pivoted about a bearing axis 27' of the first pushing rollers 19'. For docking the pushing means 10', 14' to rear tires 17 of a truck shown in FIG. 3, where the projection 18 of the dump body 16 is embodied to be long, the swivel mechanism 26' supports the pair of second pushing rollers 25' in the second position P2' shown in FIG. 8. The pair of first pushing rollers 19' of the pushing means 10', 14' is selectively employed when the projection 18 of the truck 15 is short, so that the truck 15 may be pushed, during a material transfer process, closer to the road finishing machine 1 or the charger vehicle 11 to pour the laying material 3 into the material bunker 4, 12. In this case, the second pushing rollers 25' are held in the rest position P4' by the swivel mechanism 26'.

Figure 9:
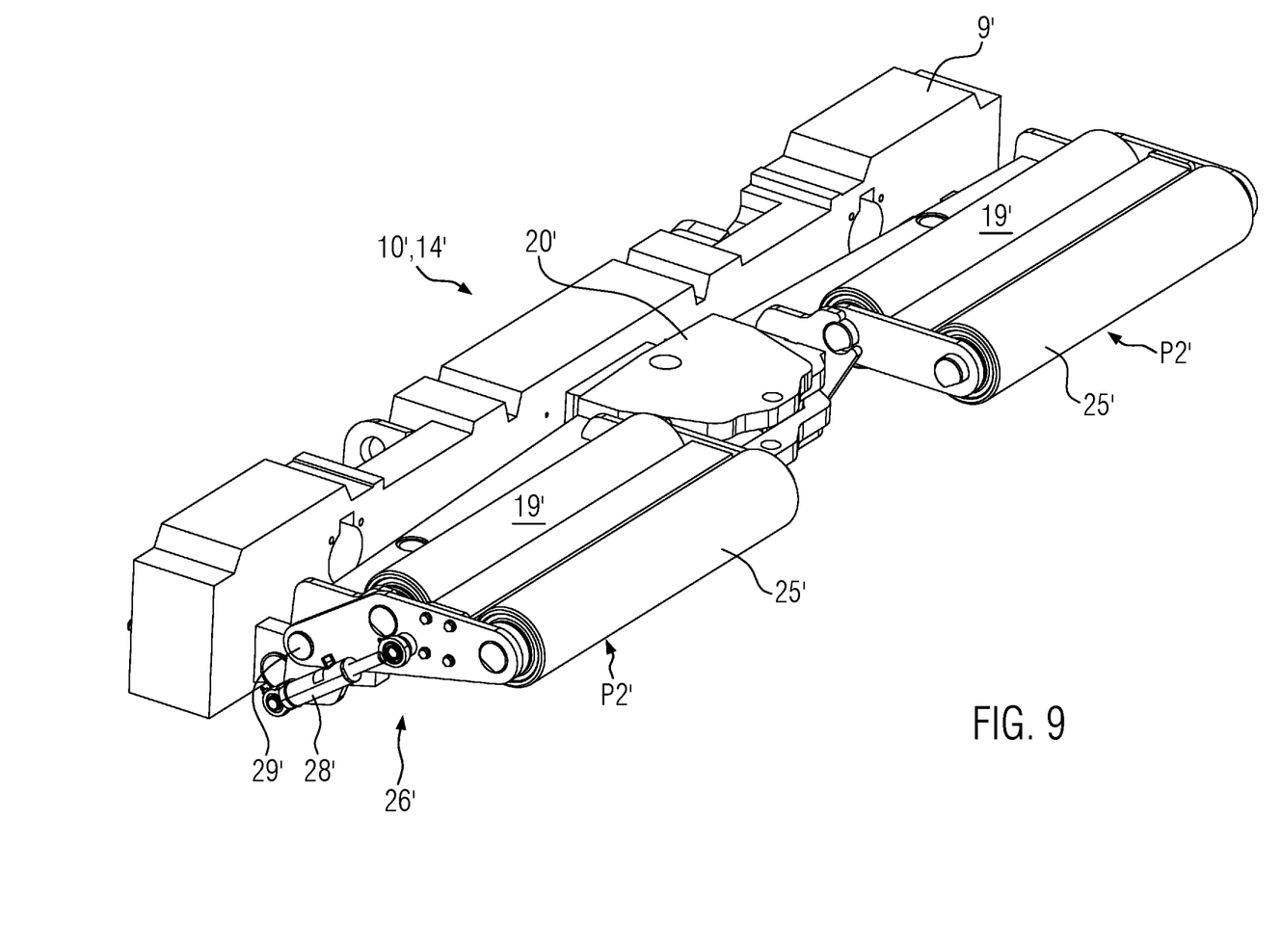
FIG. 9 shows a pushing means according to FIG. 8 with optionally employable first and second pushing rollers.

FIG. 9 shows a perspective representation of the pushing means 10', 14' described in connection with FIG. 8. According to FIG. 9, the pair of second pushing rollers 25' is mounted forward of the pair of first pushing rollers 19'. The swivel mechanism 26' holds the pair of second pushing rollers 25' aligned with the first pushing rollers 19' in the second position P2', as viewed in the horizontal plane of projection. The swivel mechanism 26' is here adjustable by means of at least one hydraulic cylinder 28' supported at the traverse 20'. Such a hydraulic cylinder 28' may be provided on either side of the pushing means 10', 14'. Furthermore, FIG. 9 shows that the swivel mechanism 26' may be fixed to the traverse 20' with a locking mechanism 29' to position the second pushing rollers 25' in the second position P2'.

Figure 10:
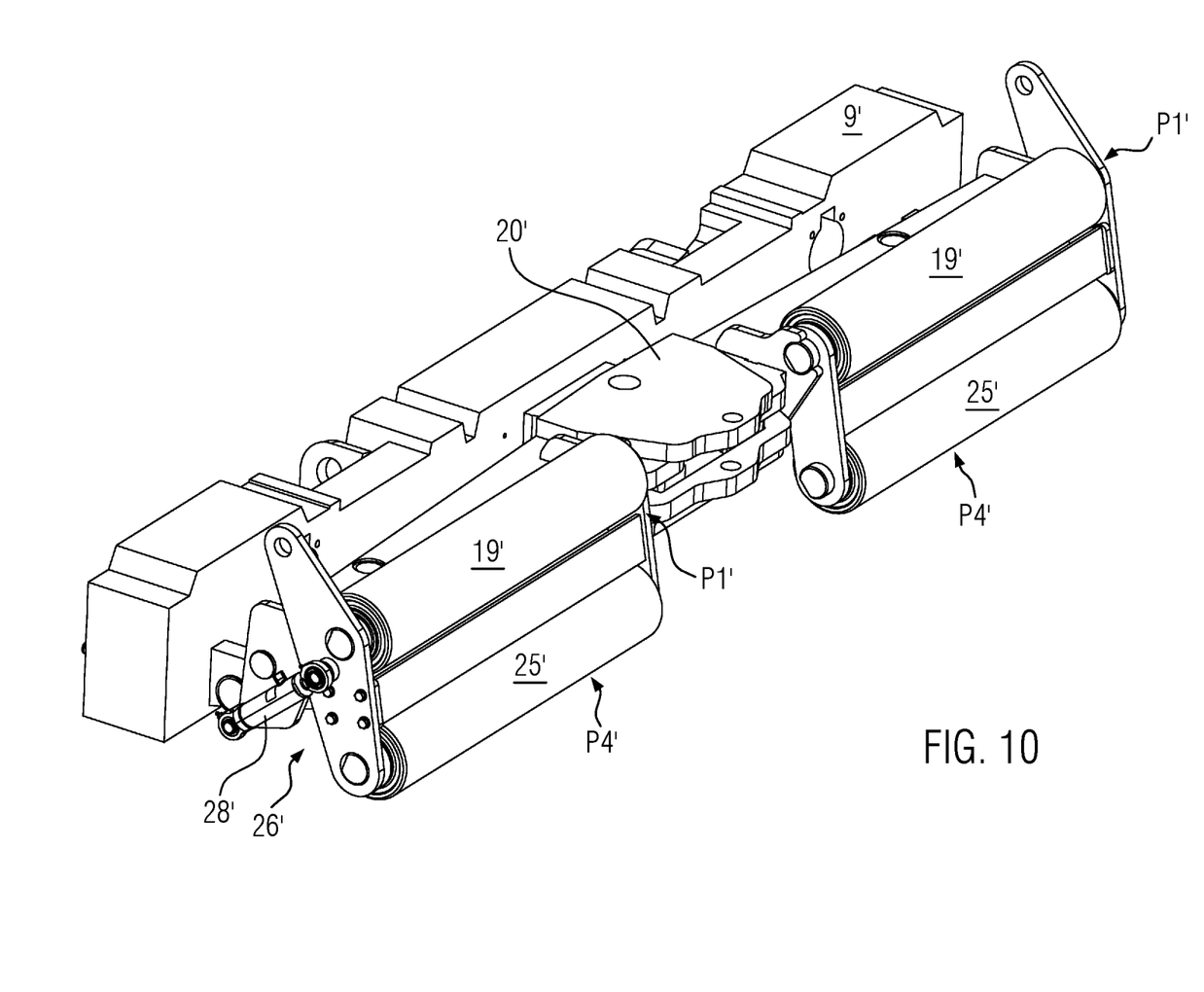
FIG. 10 shows the pushing means according to FIG. 8 with tipped down second pushing rollers.

FIG. 10 shows the pushing means 10', 14', wherein the pair of second pushing rollers 25' is transferred to the rest position P4'. Here, the pair of second pushing rollers 25' is positioned, according to FIG. 8, underneath the pair of first pushing rollers 19'. In this setting, the pushing means 10', 14' may be employed for docking, by means of the first pushing rollers 19', to rear tires 17 of a truck 15 shown in FIG. 3 if the projection 18 of the dump body 16 has a short overlength. The truck 15 may then be pushed closer to the road finishing machine 1 or the charger vehicle 11 so that the laying material 3 may be perfectly poured from the dump body 16 into the material bunker 4, 12.

Figure 11:
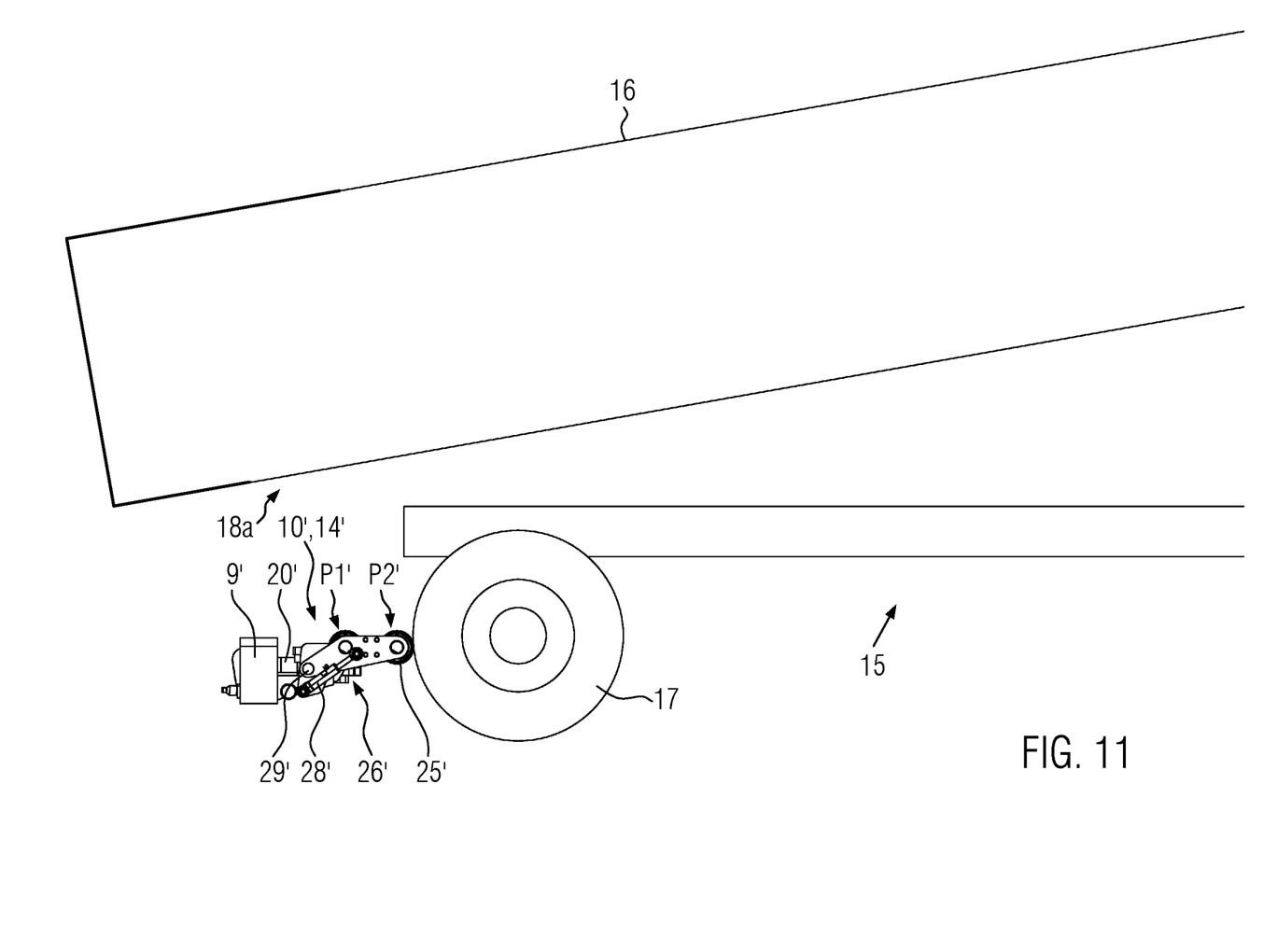
FIG. 11 shows a side view of the pushing means according to FIG. 8 with preceding second pushing rollers in a state docked to the rear wheels of a truck.

FIG. 11 shows the docking of the pushing means 10', 14' to rear tires 17 of the truck 15 having a long dump body projection 18a. In this case, the pair of second pushing rollers 25' of the pushing means 10', 14' is mounted in the second position P2' by means of the swivel mechanism 26'. In the second position P2', the pair of second pushing rollers 25' is positioned forward of the pair of first pushing rollers 19'. The locking mechanism 29' fixes the swivel mechanism 26' to the traverse 20', so that the second pushing rollers 25' remain stationarily mounted in the second position P2' with respect to the traverse 20' during the material transfer.

Figure 12:
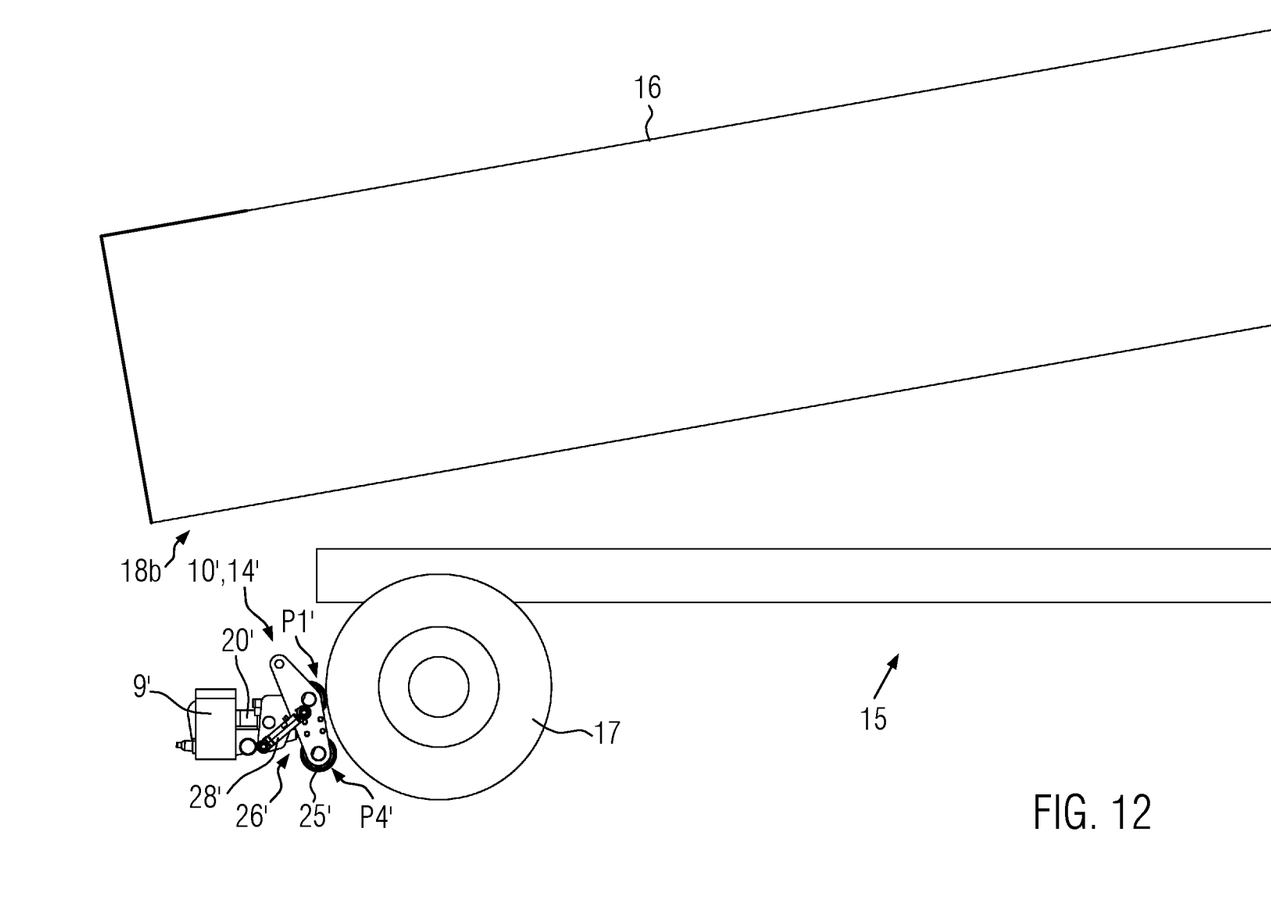
FIG. 12 shows the pushing means according to FIG. 8 with first pushing rollers docked to rear wheels of the truck.

FIG. 12 shows the pushing means 10', 14' with the pair of second pushing rollers 25' in the rest position P4'. FIG. 12 furthermore shows that now, in contrast to FIG. 11, the pair of first pushing rollers 19' is docking to the rear tires 17 of the truck 15 to push forward the truck 15 by means of the road finishing machine 1 or the charger vehicle 11 during a material transfer process. This setting of the pushing means 10', 14' is in particular employed if the truck 15 has a dump body 16 with a short dump body projection 18b.

The respective pushing means 10, 10', 14, 14' described in connection with FIGS. 4 to 12 may be employed at the road finishing machine 1 according to FIG. 1 or at the charger vehicle 14 according to FIG. 2 to dock to rear tires 17 of a preceding truck during a material transfer process.

According to FIGS. 5 to 12, the changeable attachment 21 and the swivel mechanism 26' are embodied in two parts and fixed to the traverse 20, 20'. The features described above in connection with the changeable attachment 21 and the swivel mechanism 26' may in particular be available for their respective segments (e.g., locking mechanism 29, 29').

Seen altogether, the respective pushing means 10, 10', 14, 14' are applicable for material transfer processes with different truck models and may in particular prevent a collision to occur between the material bunker 4, 12 and a dump body 16 of the truck 15.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A road making machine in the form of a road finishing machine for producing a paving layer from a laying material or a charger vehicle for supplying the road finishing machine with a laying material to be laid, the road making machine comprising:
   a chassis;
   a material bunker for receiving the laying material arranged, as viewed in a direction of travel, at a front of the chassis; and
   a pushing means which is fixed, as viewed in the direction of travel, forward of the material bunker at the chassis such that pushing rollers of the pushing means may dock to rear tires of a truck when the truck is pouring the laying material into the material bunker, wherein the pushing rollers comprise a pair of first pushing rollers which may be mounted in at least one first position, with respect to a traverse of the pushing means, in which the first pushing rollers are mounted in a seat of the traverse, wherein the pushing means comprises a further pair of second pushing rollers which may be, as viewed in a horizontal plane of projection, selectively positioned forward of the first pushing rollers.

2. The road making machine according to claim 1 wherein the second pushing rollers may be adjusted hydraulically, mechanically or electromechanically with respect to the first pushing rollers.

3. The road making machine according to claim 1 wherein the second pushing rollers are pivotable about a bearing axis of the first pushing rollers.

4. The road making machine according to claim 1 wherein the second pushing rollers are adjustable from a control platform of the road finishing machine or the charger vehicle.

5. The road making machine according to claim 1 wherein the second pushing rollers are mounted to be adjustable without tools.

6. The road making machine according to claim 1 wherein the traverse is fixed to a crossbeam of the chassis to permit a certain inclination of the traverse with respect to the crossbeam.

7. The road making machine according to claim 1 wherein the traverse may be fixed in different forward positions with respect to the chassis.

8. The road making machine according to claim 1 wherein the pushing means is mounted at the chassis of the road finishing machine or the charger vehicle to be dampened mechanically, pneumatically and/or hydraulically.

9. The road making machine according to claim 1 wherein the pushing means comprises a swivel mechanism configured to bring the second pushing rollers into a second position forward of the first position.

10. The road making machine according to claim 9 wherein the second pushing rollers may be mounted tipped down in a rest position by means of the swivel mechanism, so that the first pushing rollers may be employed for a material transfer process, and/or in a transport position in which the second pushing rollers are tipped up in the direction of the material bunker.

11. A road making machine in the form of a road finishing machine for producing a paving layer from a laying material or a charger vehicle for supplying the road finishing machine with a laying material to be laid, the road making machine comprising:
 a chassis;
 a material bunker for receiving the laying material arranged, as viewed in a direction of travel, at a front of the chassis; and
 a pushing means mounted at the chassis so that the pushing means extends forward of the material bunker as viewed in the direction of travel, the pushing means including a traverse and pushing rollers associated with the traverse and configured to dock to rear tires of a truck when the truck is pouring the laying material into the material bunker, wherein the pushing rollers comprise a pair of first pushing rollers which may be mounted in a first position in which the first pushing rollers are positioned in a seat of the traverse, wherein the pushing means comprises a pair of second pushing rollers which may be selectively positioned forward of the first pushing rollers.

\* \* \* \* \*